(12) United States Patent
Barman et al.

(10) Patent No.: US 7,082,635 B2
(45) Date of Patent: *Aug. 1, 2006

(54) UNITIZED THERMOPLASTIC FOAM STRUCTURES

(75) Inventors: Bruce G. Barman, Greensboro, NC (US); Larry DeMoss, Jamestown, NC (US)

(73) Assignee: Sealy Technology LLC, Trinity, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/402,612

(22) Filed: Mar. 28, 2003

(65) Prior Publication Data

US 2004/0187217 A1    Sep. 30, 2004

(51) Int. Cl.
*A47C 23/04* (2006.01)
(52) U.S. Cl. ............................................. 5/717; 5/721
(58) Field of Classification Search ............ 5/716–721, 5/654.1, 655.9, 655.7, 642
See application file for complete search history.

(56) References Cited

U.S. PATENT DOCUMENTS

| | | | | |
|---|---|---|---|---|
| 1,906,893 | A | * 5/1933 | Young et al. ................... | 5/716 |
| 2,408,382 | A | 10/1946 | Dubick | |
| 2,540,441 | A | * 2/1951 | Gordon .......................... | 5/720 |
| 2,826,769 | A | 3/1958 | Drews | |
| 2,940,089 | A | 6/1960 | Koenigsberg | |
| 3,010,122 | A | * 11/1961 | Koenigsberg .................. | 5/721 |
| 3,100,305 | A | 8/1963 | Kaye | |
| 3,262,135 | A | * 7/1966 | Fasanella ....................... | 5/717 |
| 3,618,146 | A | 11/1971 | Ferdinand | |
| 3,695,421 | A | * 10/1972 | Wood .......................... | 206/523 |
| 3,848,283 | A | 11/1974 | Ikeda | |
| 3,869,739 | A | * 3/1975 | Klein ............................ | 5/720 |
| 4,067,076 | A | 1/1978 | Krier | |
| 4,075,721 | A | 2/1978 | Autrey | |
| 4,286,344 | A | 9/1981 | Ikeda | |
| 4,429,421 | A | * 2/1984 | Sklar ........................... | 5/654.1 |
| 4,650,251 | A | 3/1987 | Shimada | |
| 4,677,701 | A | 7/1987 | Galumbeck | |
| 4,686,725 | A | 8/1987 | Mitchell | |
| 4,907,309 | A | 3/1990 | Breckle | |

(Continued)

FOREIGN PATENT DOCUMENTS

JP          59-202844        * 11/1984

(Continued)

OTHER PUBLICATIONS

Internet article, "Kemlite Company, Inc." (10 pages), Dec. 4, 2002.*

*Primary Examiner*—Sunil Singh
(74) *Attorney, Agent, or Firm*—Roetzel & Andress

(57) ABSTRACT

Three-dimensional unitized thermoplastic foam structures are made by thermoplastic welding of different foam components. The unitized foam structures may include a planar base to which other foam components are welded to project from the base and provide a flexible three-dimensional structure. The thermal bonding or welding of the thermoplastic foam components creates a unitized structure which is both flexible and load bearing. For mattress and seating applications, the welded foam structures may be combined with an innerspring, and certain of the foam components of the structure may mechanically engage parts of the innerspring. The preferred foam deck has first and second panels interconnected by one or more webs. One or more foam decks may be employed. Other foam components may be attached to the foam decks or other components. The utilized foam structures can be employed as single or double-sided mattresses, seating structures or other flexible support structures.

18 Claims, 10 Drawing Sheets

U.S. PATENT DOCUMENTS

| | | | |
|---|---|---|---|
| 5,040,255 A * | 8/1991 | Barber, Jr. | 5/720 |
| 5,048,167 A | 9/1991 | Heffley et al. | |
| 5,133,116 A | 7/1992 | Wagner et al. | |
| 5,210,890 A | 5/1993 | Hagglund | |
| 5,239,715 A | 8/1993 | Wagner | |
| 5,327,596 A * | 7/1994 | Wallace et al. | 5/655.7 |
| 5,331,698 A * | 7/1994 | Newkirk et al. | 5/602 |
| 5,467,488 A | 11/1995 | Wagner | |
| 5,468,488 A | 11/1995 | Wagner | |
| 5,469,590 A | 11/1995 | Simon | |
| 5,537,699 A | 7/1996 | Bonaddio et al. | |
| 5,687,439 A | 11/1997 | Wagner | |
| 5,724,686 A | 3/1998 | Neal | |
| 5,787,532 A | 8/1998 | Langer et al. | |
| 6,023,803 A | 2/2000 | Barman | |
| 6,041,459 A | 3/2000 | Nunez et al. | |
| 6,128,798 A | 10/2000 | Barman et al. | |
| 6,263,533 B1 | 7/2001 | Dimitry et al. | |
| 6,306,235 B1 | 10/2001 | Henderson | |
| 2005/0039624 A1 * | 2/2005 | Barman | 5/717 |

FOREIGN PATENT DOCUMENTS

| | | | |
|---|---|---|---|
| JP | 63-247027 | * | 10/1988 |
| JP | 11247423 | * | 9/1999 |
| WO | 0100958 | * | 7/1983 |

* cited by examiner

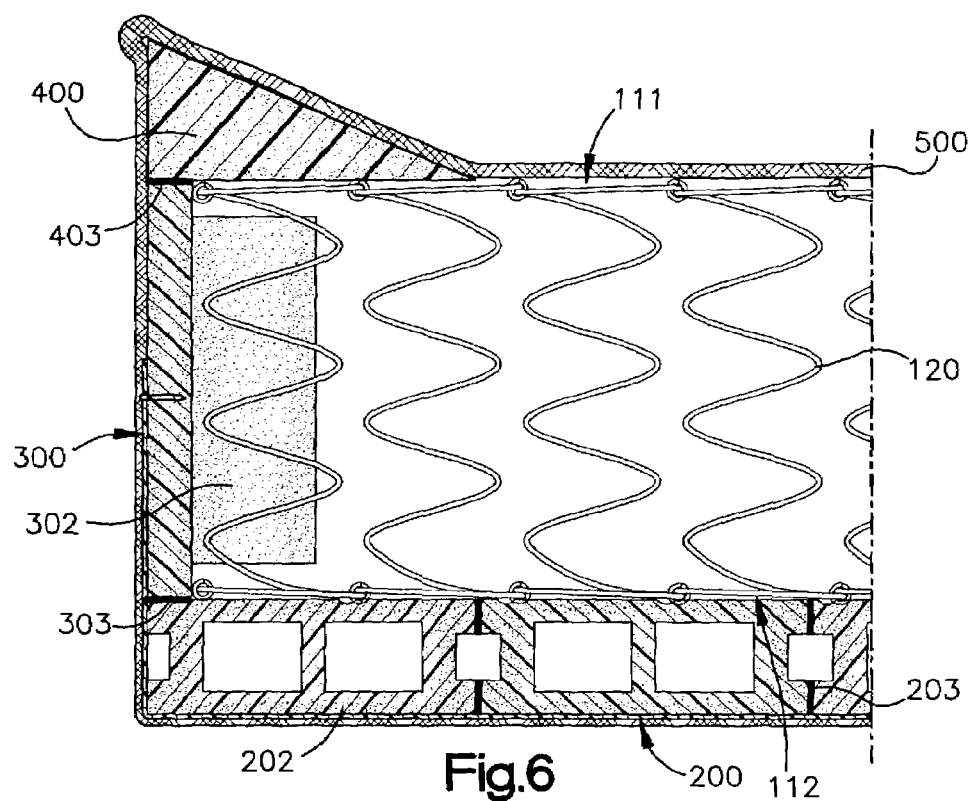
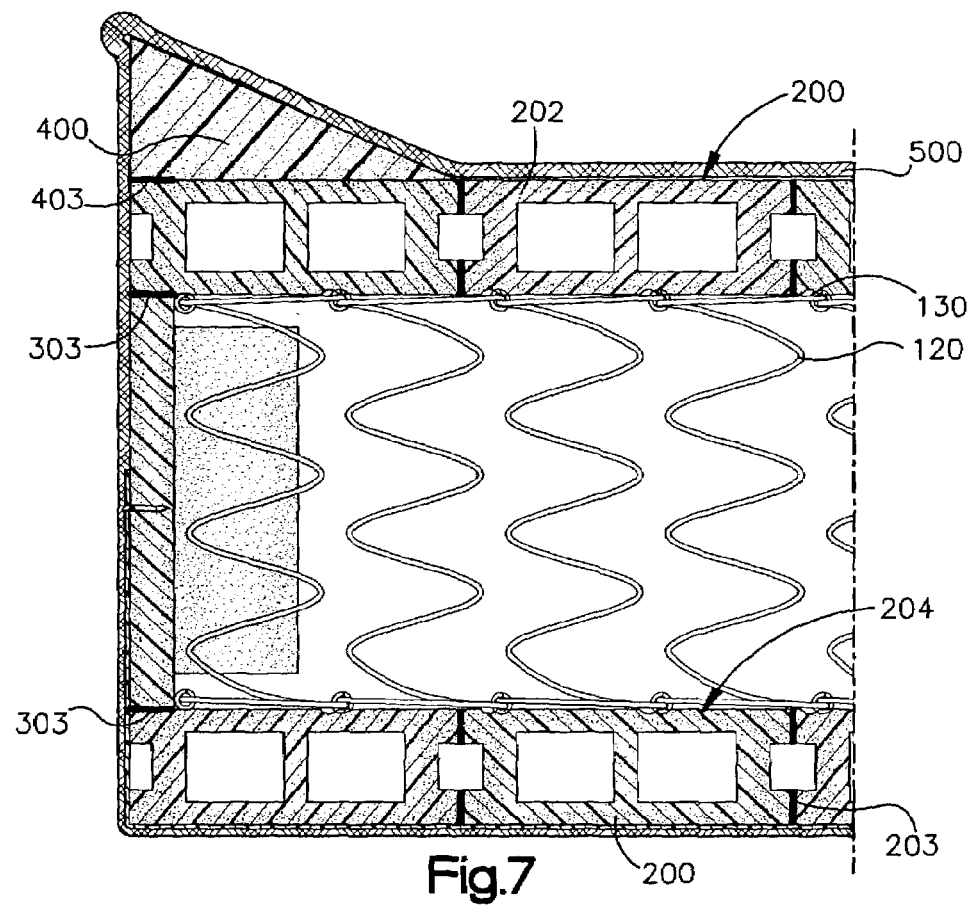

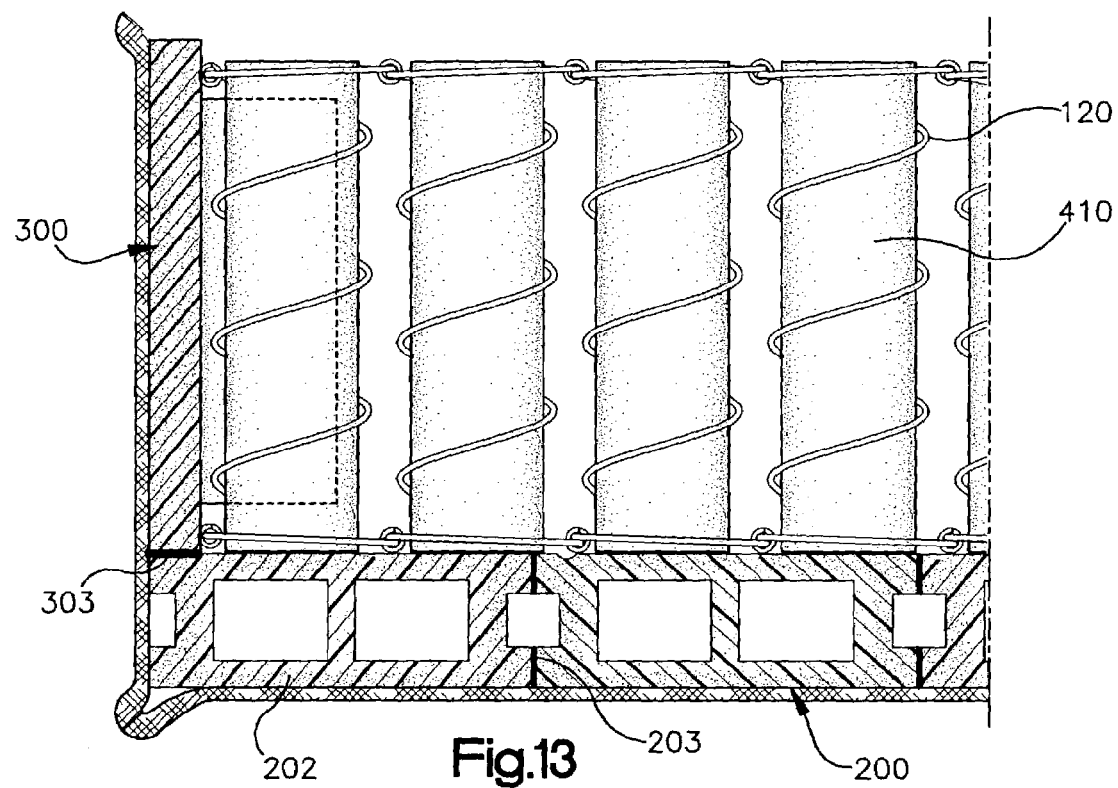
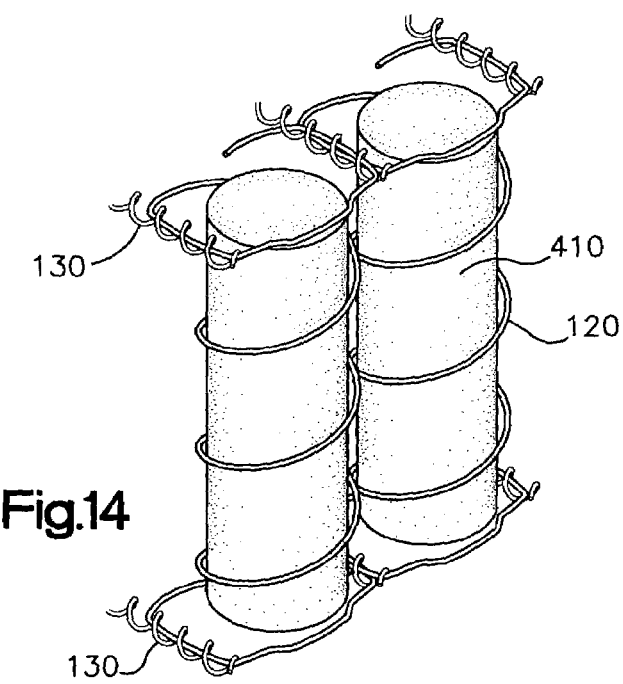

UNITIZED THERMOPLASTIC FOAM STRUCTURES

FIELD OF THE INVENTION

The present invention pertains generally to structures made of foam material, and to foam parts, which are assembled or bonded together, to form three-dimensional utilized structures.

BACKGROUND OF THE INVENTION

Different types of foam and foam parts have been used extensively in seating and bedding as flexible support material. Semi-rigid open and closed cell foams of polyethylene, polyurethane or polystyrene have been used in combination with other components and load-bearing structures, such as wire form innersprings and framing to form flexible supports, such as described in U.S. Pat. Nos. 5,048,167; 5,469,590; 5,467,488 and 5,537,699 and 5,787,532. In most of these springs support products, the foam pieces surround or interfit with spring elements, and rely on mechanical connection with the spring elements to keep the foam pieces in place. Foam pieces have also been adhesively bonded and combined with innersprings. The types of foams used in these applications are typically open-cell polyurethane and latex materials, which can be effectively bonded by compatible adhesives. The open-cell structure of these types of foams results in easier compression or lower ILD which is suitable for many bedding and seating applications, particularly for support surface or topper layers underneath upholstery. They are not generally utilized as structural members in a mattress or support cushion in seating. Also, polyurethane and other non-thermoplastic type foams cannot be bonded or welded by any heat-source process due to their decomposition properties.

Some foam shapes have been used integrally with springs to augment or otherwise support metal spring structure, as shown for example in U.S. Pat. Nos. 5,133,116; 5,239,715; 5,467,488 and 5,687,439. Because this use of foam relies on the surrounding metal structure to hold it in place, the foam itself is not in the form of a unitized three-dimensional support structure with its own load-bearing capacity.

Another use of foam in connection with an innerspring is disclosed in U.S. Pat. No. 5,787,532, wherein an extruded foam piece is used as perimeter wall to an innerspring, with fingers which mechanically engage the coils of the innerspring. While this provides some vertical support at the perimeter of the innerspring, it relies on mechanical attachment to the innerspring for the correct orientation. It also only provides support in the vertical direction and does nothing to stabilize the innerspring in the lateral or horizontal directions.

One type of foam which has been used for these types of applications is closed-cell polyethylene foam which is mold or extruded by known processes into desired shapes. Closed-cell foam has greater support properties due to the fact that each closed cell contains a gas which maintains an inflated state when under compression, as compared to open-cell foams from which a substantial volume of air is displaced when compressed.

SUMMARY OF THE PRESENT INVENTION

The present invention is a novel combination of thermally bonded, welded or fused foam components which form a unitized three-dimensional structure. As used herein, the term "unitized" refers to the thermal bonding of two or more foam components to form a three-dimensional foam structure by welding foam parts or components together. The foam used is to form the unitized structures of the invention is preferably thermoplastic in behavior, being able to reversibly melt and solidify without decomposing. In one embodiment of the invention, a thermally bonded unitized three-dimensional foam structure is combined with another support element, such as an innerspring, to provide a flexible support structure. In accordance with the invention, thermoplastic foam components or pieces are thermally bonded, welded or fused together, preferably by thermal welding, to form three-dimensional structures which serve as housing or encapsulations for reflexive devices such as innersprings in wire, plastic or other forms. The surrounding welded thermoplastic foam structure about the innerspring dampens and softens the feel of the innerspring, and provides edge support and stability, and a protective casing about which upholstery is applied. In a preferred embodiment, the thermoplastic foam components or pieces are made of extruded foam, such as air-blown polyethylene. Thermoplastic foam components made of the same material, such as polyethylene, are readily bonded by heat, welded or fused together by various devices and processes, such as thermal welding by a heated element or hot air or other gases. The utilized thermoplastic foam structures of the invention can be produced in parts which are separately assembled by a thermal welding process, or assembled in connection with an innerspring by performing the welding with the foam pieces in place relative to an innerspring.

In one general aspect of the invention, there is provided a unitized thermoplastic foam structure made of two or more thermoplastic foam components which are thermally bonded, welded or fused together to form a three-dimensional foam structure which is combined with an innerspring assembly. In one form, the three-dimensional foam structure serves as both a support base or deck for the innerspring assembly, and as a perimeter wall or at least partial encapsulation of the innerspring assembly. In a mattress embodiment, one of the foam components is in the form of a foam deck which has parallel planar sides, with one of the sides serving as a support surface for an innerspring. With an innerspring positioned on one of the sides of the foam deck, at lest one additional foam component, such as a wall or other vertical structure, which is thermally bonded or fused to the foam deck, is oriented to rise from the plane of the deck in a third dimension form a unitized foam structure about or in connection with the innerspring. The foam deck is in one embodiment a repeated beam structure with multiple parallel box beams forming a semi-rigid deck which supports one side of an innerspring assembly. In another embodiment the foam deck has a solid foam cross-section. The combination of the unitized foam structure and an innerspring assembly can be used to provide a one-sided mattress with superior support characteristics resulting from the flexibility of the foam deck. The vertical profile of the box beams of the foam deck defines a degree of stiffness and flexure which responds to localized loads on the overlying innerspring. The stiffness or density of the foam deck alters the support characteristics and feel of the innerspring, whereby a mattress can be designed accordingly for a desired feel. In a preferred embodiment, the foam deck is formed by a plurality of extruded foam beams which are bonded or fused together by welds along abutting edges.

In accordance with another aspect of the invention, a mattress is formed by the combination of an innerspring and a foam deck adjacent the innerspring, and extruded foam rails located at edges of the innerspring and in contact with the foam deck, the foam rails being thermally bonded to the foam deck to form a unitized foam structure about the innerspring. The unitized foam structure functions with the innerspring to encapsulate and support the innerspring, to limit lateral deflection, to dampen individual coils of the innerspring, and to provide complimentary flexible support. The novel method of manufacture by which the unitized foam structure is integrated with the innerspring involves the thermal bonding, welding or fusing of thermoplastic foam components about the innerspring, eliminating the requirement of mechanical attachment of foam pieces to the innerspring.

BRIEF DESCRIPTION OF THE FIGURES

In the Figures:

FIG. 6 is a cross-sectional view of an alternate embodiment of a unitized foam structure single sided mattress of the invention;

FIG. 7 is a cross-sectional view of an alternate embodiment of a unitized foam structure single sided mattress of the invention;

FIG. 13 is a cross-sectional view of an alternate embodiment of a unitized foam structure single sided mattress of the invention;

FIG. 14 is a perspective view of foam components incorporable into a unitized foam structure mattress of the invention;

DETAILED DESCRIPTION OF PREFERRED AND ALTERNATE EMBODIMENTS

Figure 1:
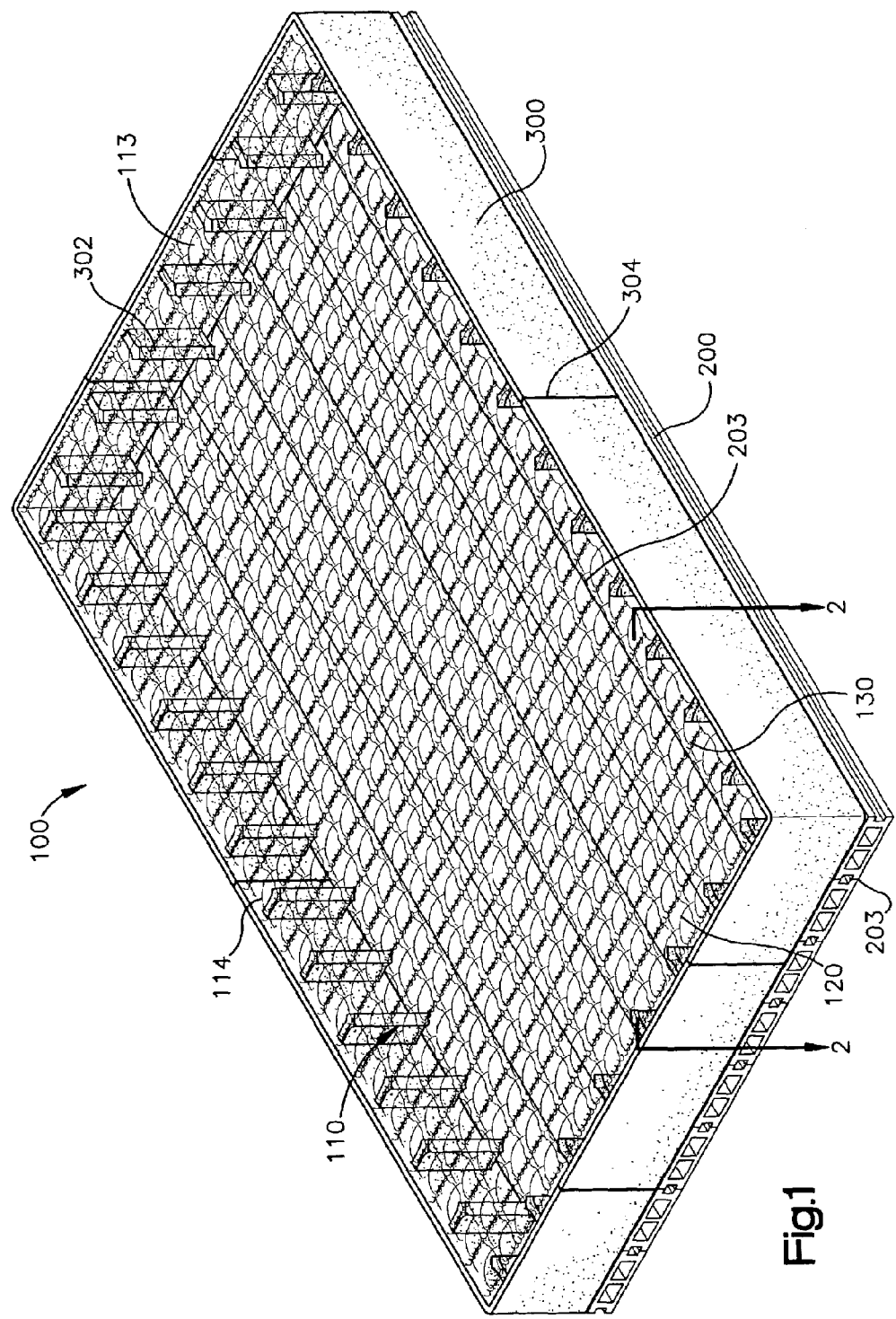
FIG. 1 is a perspective view of a unitized foam structure mattress of the invention.

With reference to FIG. 1, there is illustrated a unitized foam structure mattress, referenced generally as 100, which in this particular embodiment of the invention is in the form of a one-sided mattress, with a unitized foam structure providing a structural encapsulation and base for an innerspring, as further described. The unitized foam structure mattress includes an innerspring 110 (also referred to herein as an "innerspring assembly") which is made up of a plurality of wire form coils 120 which are interconnected or laced together by helical wires 130 as known in the art, in an array to form an assembly which has a first support side generally defined by aligned first ends of the coils or spring elements, and a second support side generally defined by the aligned second ends of the coils or spring elements, the first and second support sides being parallel, and a perimeter about the first and second support sides defined by perimetrical coils at the edges of the array, defining a generally rectangular shape to the innerspring assembly. The innerspring 110 has first and second support surfaces 111 and 112, and lateral edges 113 and 114 defining a generally rectangular spring form which can be dimensioned to conventional or traditional mattress sizes, or in other shapes or sizes for use in specialty mattresses for aircraft or watercraft, or seating and furniture applications.

Although illustrated with this type of wire form interconnected innerspring, the invention is equally applicable to all types of innersprings and innerspring assemblies, regardless of the form of the individual coils and the manner of interconnection of the coils, and including such variants as Marshall type pocketed coils and coils made of materials other than steel spring wire. The invention is also highly adaptable for use with other types of reflexive bodies which may be used in place of traditional innersprings having individual coils or spring elements. Some examples of other types of innersprings which may be used in combination with the unitized foam structures include: wire-form innersprings of any variety such as Bonnel or other helical designs, continuous wire-form designs which do not have individual helical coils, interconnected springs or coils made of plastic or composite materials, pocketed or Marshall-type coils held in an array by material which is sewn or bonded, and solid blocks of material such as latex foam or other suitable foams or layers of foam.

Figure 3:
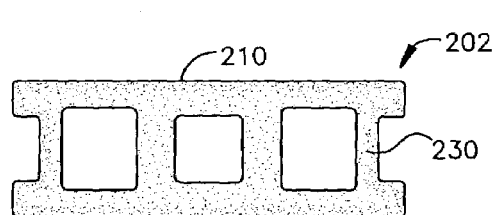
FIGS. 3–3A are cross-sectional views of alternate embodiments of a foam box beams for a unitized foam structure mattress of the invention.
Figure 3A:
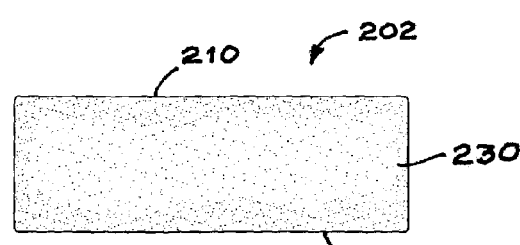
Figure 4:
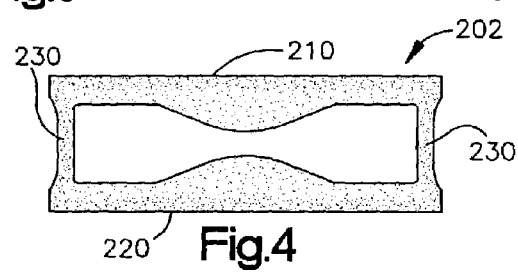
FIG. 4 is a cross-sectional view of an alternate foam box beam used in a unitized foam structure mattress of the invention.
Figure 5:
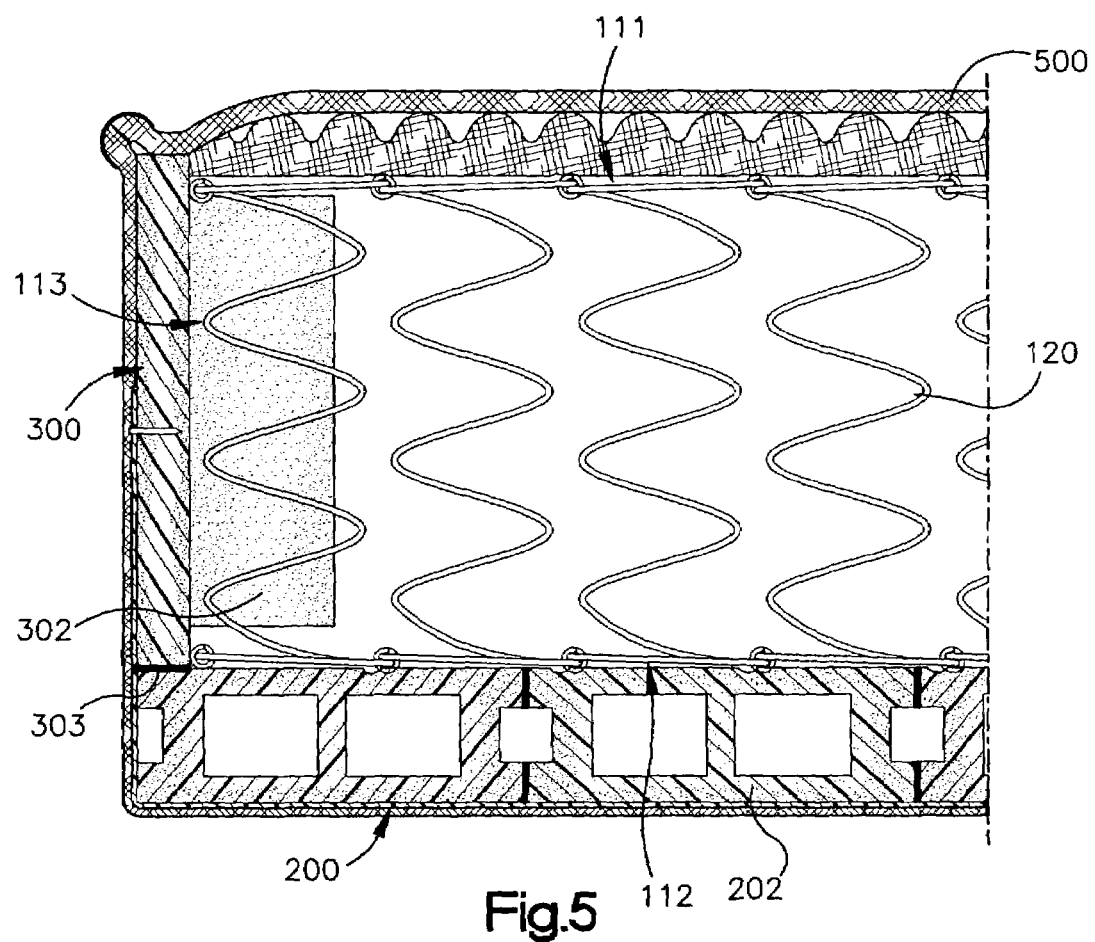
FIG. 5 is a cross-sectional view of a unitized foam structure single sided mattress of the invention.

A foam deck, indicated generally as 200, is positioned adjacent to the innerspring 110, for example underlying or proximate to support surface 112. The foam deck 200 is preferably formed of extruded foam box beams 202 of the type illustrated in the cross-sectional views of FIGS. 3–12, but may alternatively be simply a foam sheet or slab with first and second panels 210, 220, as shown in FIG. 3A. In the box beam form, the foam deck 200 has a first panel 210 and a second panel 220 which is parallel to and spaced from panel 210, and held in this arrangement by a structure between the panels 210, 220, such as webs 230, which may be in any form which spans between the panels across the gap between the panels. At the edges of the foam deck 200, the webs 230 form a side wall which is generally vertical. The side walls define the perimeter of the foam deck 200. The extent of the gap or spacing between the panels 210, 220 can be designed according to desired properties, such as desired flexibility of the foam deck 200 and overall height dimension of the mattress. By changing the number, spacing and size of webs 230, the stiffness of the foam deck 200 can be altered. As the structure which underlies the innerspring 110 in a one-sided mattress, this in turn alters the stiffness or feel of the mattress, by altering the support response to compression of the innerspring. In other words, the stiffness of the foam deck 200 is transferred through the innerspring 110 to alter the feel of the mattress.

The foam deck 200 also serves as the structural and protective base of a one-sided mattress. The mattress upholstery or covering is applied over the bottom panel 220 as further described. Because the foam deck 200 has the multiple properties of the rigidity of three-dimensional structure and the closed-cell foam matrix, along with flexibility and bendability, it provides a superior one-sided mattress which is both protected from the underside, and which has shock absorption and spring dampening of the innerspring from the bottom, non-support surface 112 of the innerspring 110. Also, because the foam deck 200 is flexible, even when thermally bonded or welded to other foam components as further described, it remains flexible in along with the innerspring 110.

Figure 17:
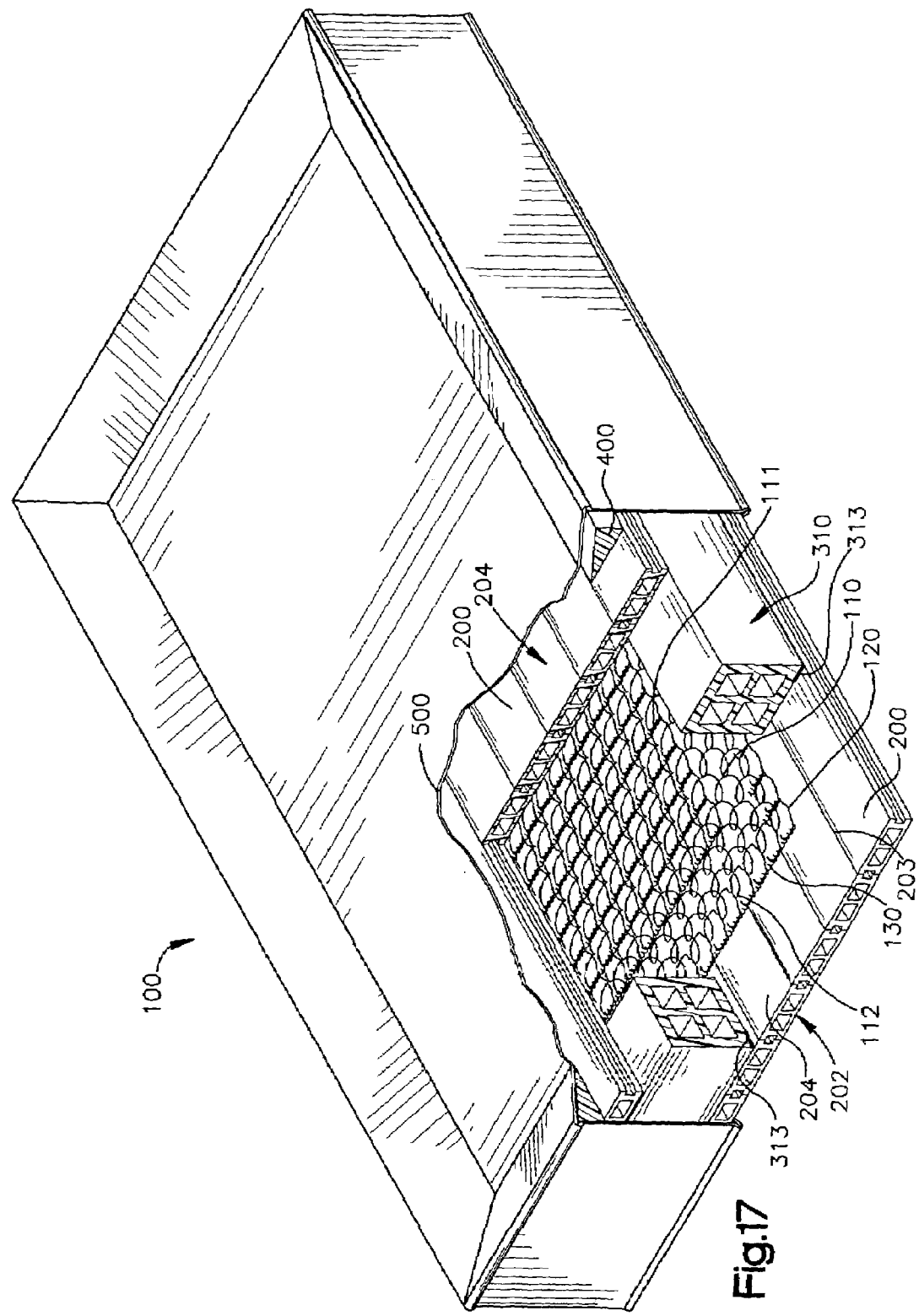
FIG. 17 is a perspective view of an alternate embodiment of a unitized thermoplastic foam structure mattress of the invention.

To produce a box beam twin-panel version of the foam deck, multiple segments of box beams 202 can be bonded or fused together to form a major support surface 204 or a slab which is trimmed or cut to form a platform of the desired dimensions, which preferably correspond to the innerspring 110. This type of construction of a foam deck 200 is shown in FIGS. 1 and 17, with the thermal weld or bond lines 203 indicated. One proprietary method of forming sheets of foam suitable for use as the deck 200 in the present invention is described in U.S. Pat. No. 6,306,235. This method is particularly suitable for forming a deck 200 of fused box beams 202 of various cross-sectional configurations, such as those shown in the Figures and others. These box beam design variations are used to complement and tune a unitized foam structure mattress of the invention with the spring characteristics of the innerspring to provide the desired mattress support and feel properties. Apart from this particular method of manufacture, box beams 202 of varying cross-sectional configurations can be combined in a single foam deck 200 for customized mattress properties. The fusing of the parallel edges of the beams 202 can be automated or by manually operated fusing or welding instrument such as an adhesive applicator or heat-knife welder. The beams may be arranged to run the length or width of the mattress, or diagonally or on a slight spiral relative to the innerspring.

The foam deck 200 performs several functions, including serving as a foundation or base for the innerspring 110 particularly when constructed as a one-sided mattress, providing dimensional stability to the innerspring in both the x and y directions (parallel to the surface) and providing a platform for formation of the unitized foam structure about the innerspring, as further described. Use of the foam deck 200 underneath the innerspring 110 is advantageous over the conventional construction of one-sided mattresses which simply cover the bottom surface of the innerspring with a thin layer of material, leaving the underside of the innerspring unsupported and unprotected. The underlying foam deck 200 provides a soft, flexible foundation to the innerspring, and increases the overall height of the mattress without requiring any additional height to the innerspring.

Figure 2:
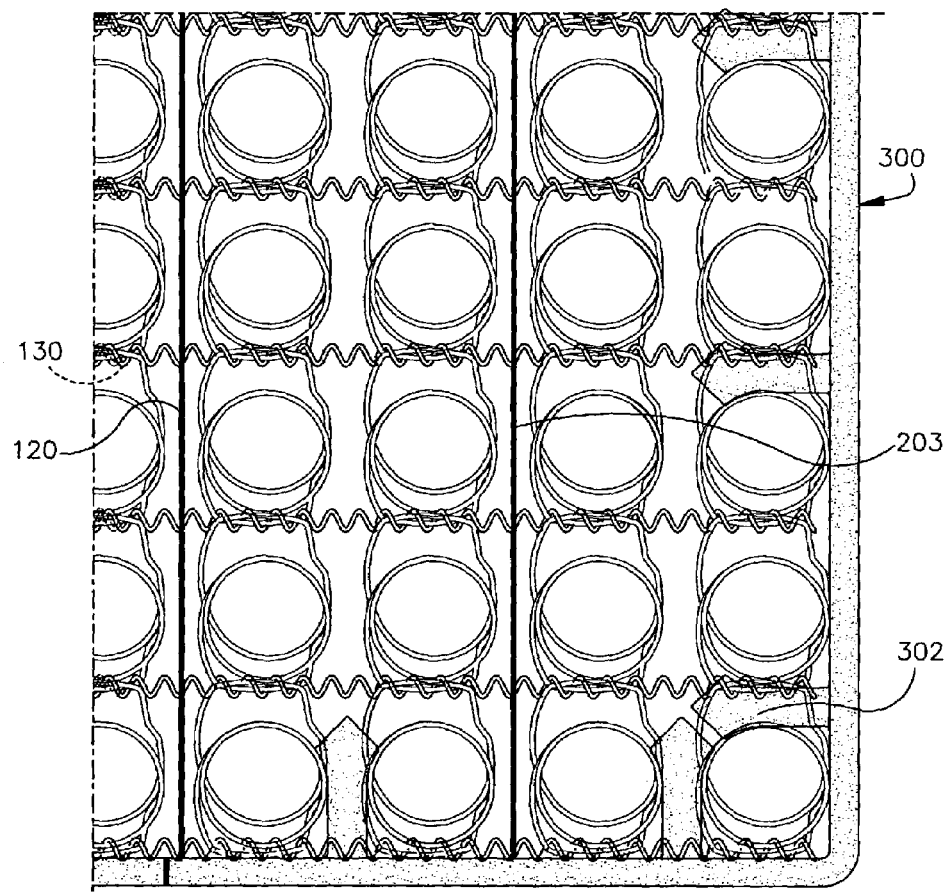
FIG. 2 is a plan view of side foam components of a unitized foam structure mattress of the invention.

The primary additional components which are thermally bonded with the foam deck 200 to form a unitized foam structure are foam pieces located at lateral edges of the innerspring 110, and which are thermally bonded or welded to the support surface 204 of foam deck 200. In one embodiment, as illustrated in cross-section in FIG. 2, and in end profile in FIGS. 5–7, edge components 300 are positioned at lateral edges of support surface 204 of foam deck 200 and thermally bonded or welded thereto, as indicated by welds 303. The edges of support surface 204 are the areas adjacent to the vertical sides of the foam deck 200. This is the preferred location for the welds 303 which provide the thermal bonding of the foam components of the unitized foam structure. As an additional and optional structural feature to the edge components 300, flanges or projections 302 may extend from an interior side of the edge components 300 for positioning between coils of the innerspring 110. Frictional engagement of the flanges or projections 302 with the coils serves to hold the edge components 300 in the desired vertical orientation, and closely adjacent to the edge coils of the innerspring 110. The edge components 300 are alternatively referred to as side rails, and serve to substantially stiffen the edges of the mattress and the support of the innerspring at its edges, which are preferably without the conventional border wire about the perimeter of the innerspring. The bonding or fusing of the edge components 300 to the foam deck 200 creates a unitized foam structure which substantially encapsulates the innerspring 110, providing dimensional stability to the innerspring, and a flexible foundation for a one-sided mattress.

The edge components 300 can also be made as extruded foam pieces like the beams 202 of the foam deck 200, and cut to the appropriate height for the mattress and innerspring. As shown in FIG. 1, multiple segments of the edge component 300 can be thermally bonded or welded together in series to form a long strip for the perimeter of the innerspring. The vertical seams 304 between the abutting sections of the edge components 300 are preferably left open, not bonded, to allow the three-dimensional structure to flex, and to allow air inside the mattress to escape under compression.

Figure 15:
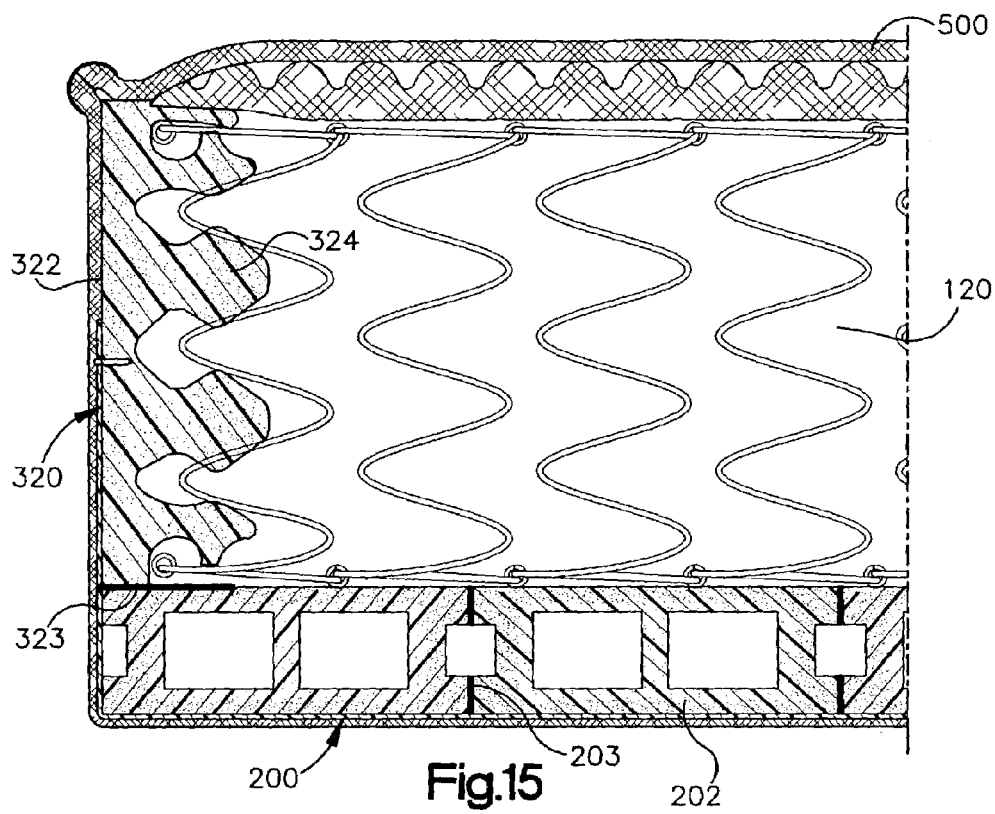
FIG. 15 is a cross-sectional view of an alternate embodiment of a one-sided mattress constructed with a unitized foam structure of the invention.
Figure 16:
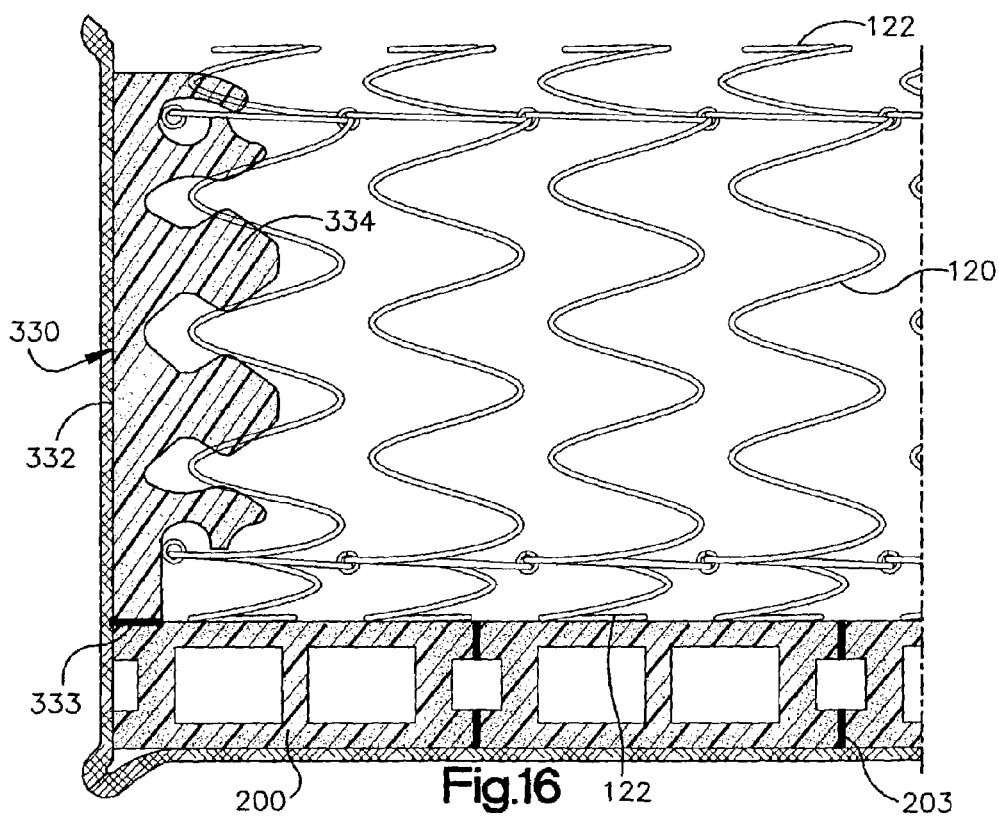
FIG. 16 is a cross-sectional view of an alternate embodiment of a one-sided mattress constructed with a unitized foam structure of the invention.

FIGS. 15 and 16 illustrate a unitized foam structure in combination with an innerspring, with alternate embodiments of edge components 320 in FIG. 15 and 330 in FIG. 16. These edge components 320, 330 each have a respective outer side wall 322 and 332, and inward protrusions parallel extensions 324, 334 which fit horizontally between the convolutions of the coils 120. A respective bottom edge is thermally bonded or welded, at welds 323, 333 to the edge of the top surface or panel 210 of foam deck 200. This provides mechanical and thermally welded connection of the edge components 320, 330 to the innerspring 110 and the foam deck 200, keeping the side walls firmly in place and alignment and keeping the mattress square and stable. As the coils of the innerspring at the perimeter, which are engaged with the extensions 324, 334 are compressed, the edge components 320, 330 provide substantial structural support at the edge of the innerspring, while allowing the side walls 322, 332 to flex to some degree in accordance with the flexibility of the preferred closed-cell polyethylene foam.

Figure 8:
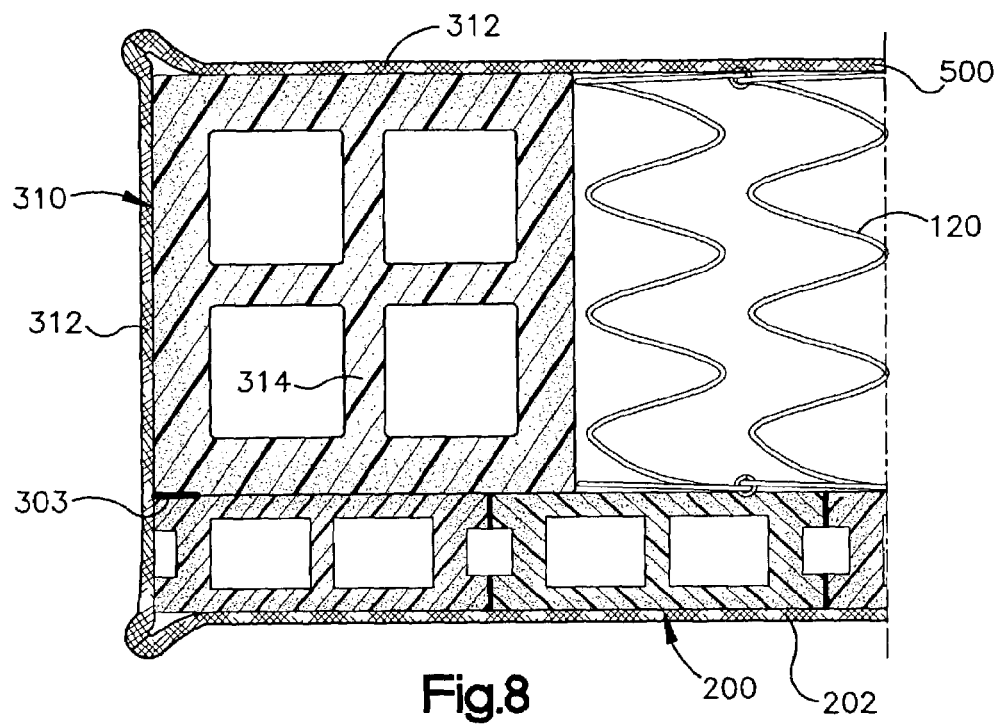
FIG. 8 is a cross-sectional view of an alternate embodiment of a unitized foam structure single sided mattress of the invention.
Figure 9:
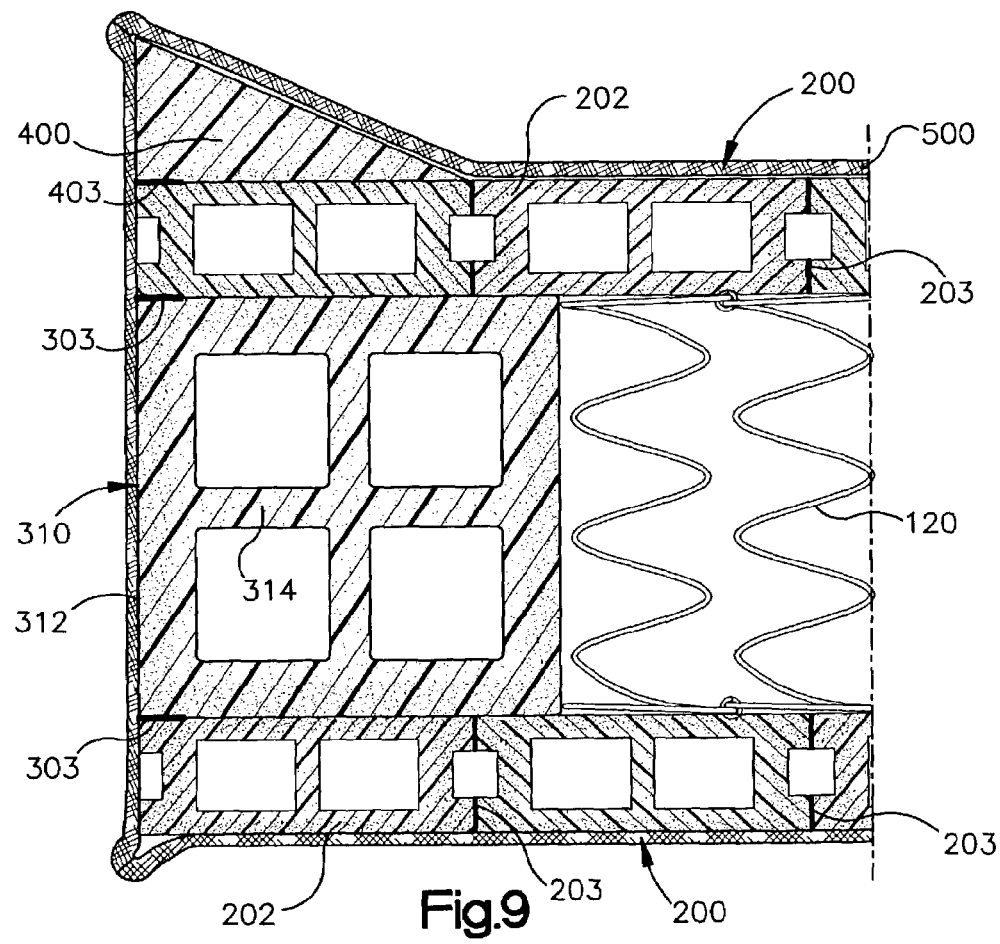
FIG. 9 is a cross-sectional view of an alternate embodiment of a unitized foam structure single sided mattress of the invention.
Figure 10:
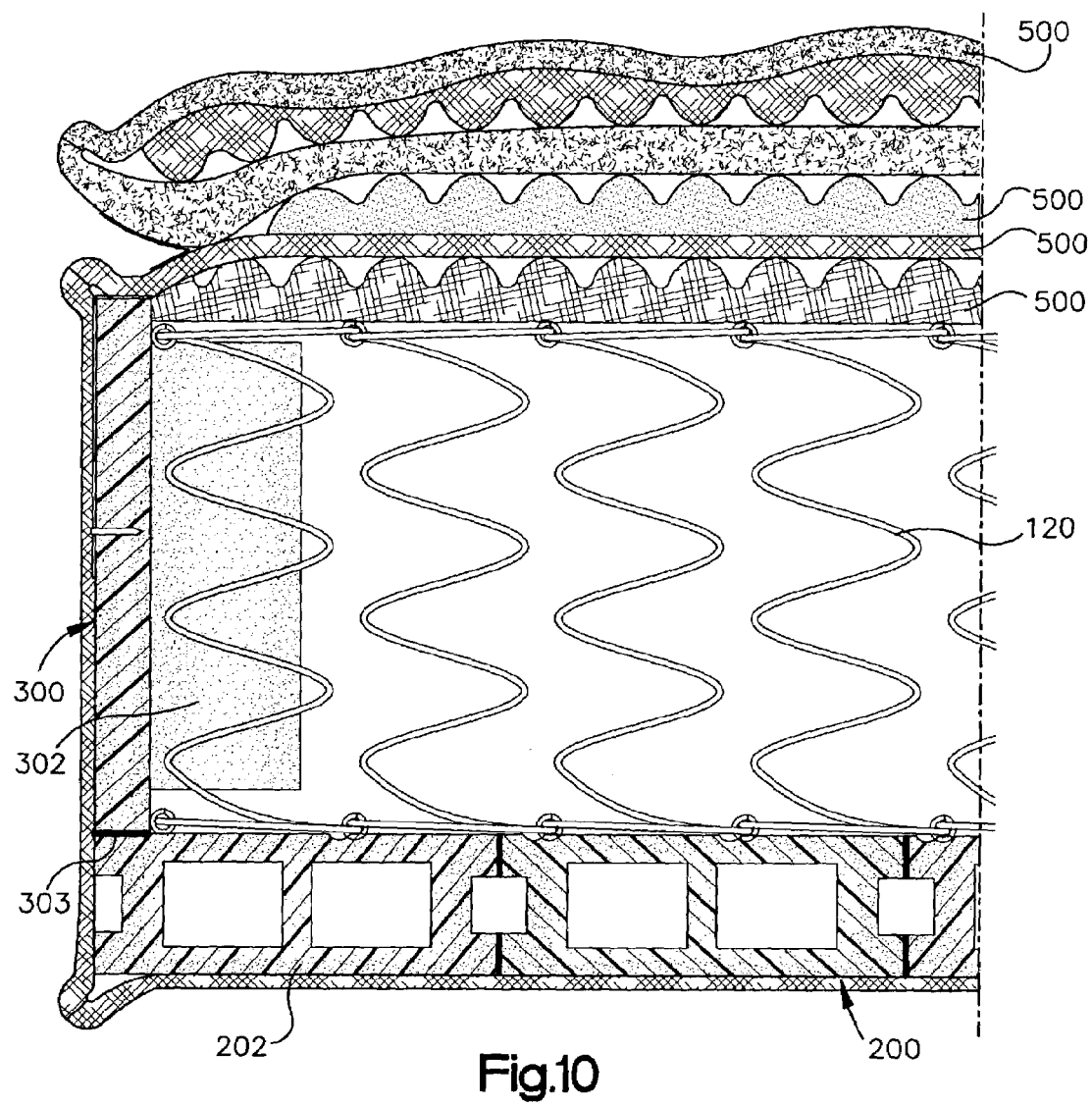
FIG. 10 is a cross-sectional view of an alternate embodiment of a unitized foam structure single sided mattress of the invention.
Figure 11:
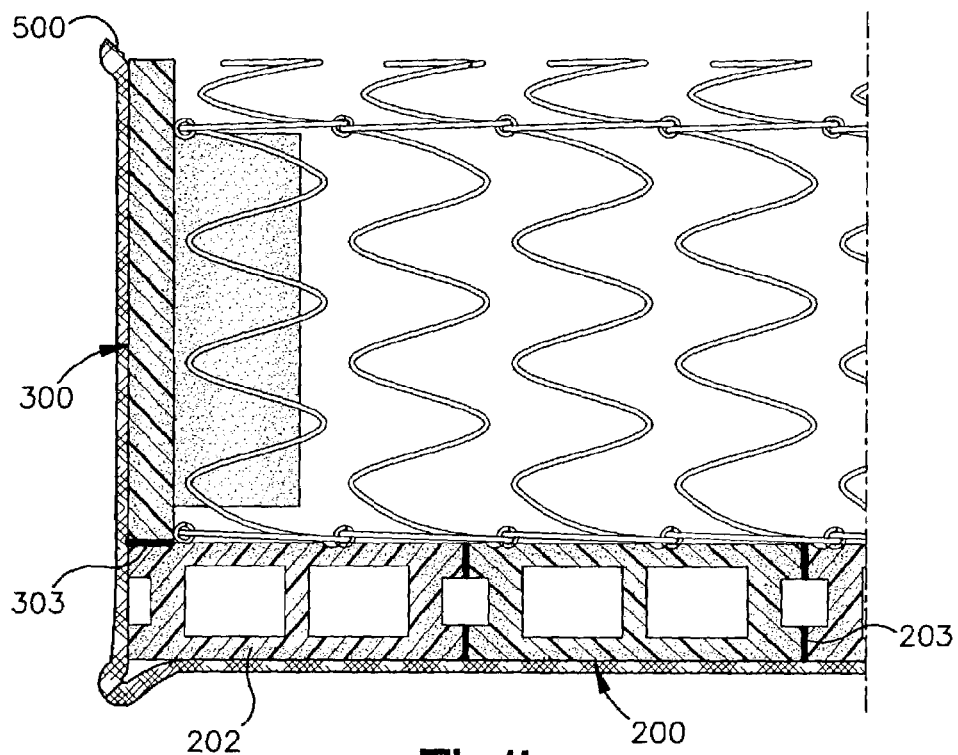
FIG. 11 is a cross-sectional view of an alternate embodiment of a unitized foam structure single sided mattress of the invention.

An alternate embodiment of an edge component which can be used to form the unitized foam structure mattress of the invention is shown in FIGS. 8, 9 and 17. Edge component 310 has a box beam configuration, with a generally rectangular cross-section defined by exterior walls 312 and internal structural webs 314 which can be in any particular arrangement to provide internal structural strength and rigidity. The greater area of the lower exterior wall 312 of edge 310 provides a greater area of contact with the underlying foam deck 200 for thermal bonding or welding of the edge 310 to the foam deck, as indicated by welds 313. The box beam configuration of edge component 310 resists lateral deformation which, when placed adjacent to the perimeter coils of the innerspring 110, keeps the coils of the innerspring registered in substantially vertical alignment for optimum reflexive support.

The upper exterior wall 312 provides a wide area of firm support at the edges or about the perimeter of the innerspring 110. This avoids the well-known "roll-off" action of a conventional innerspring mattress at its perimeter. This combined with the foam deck 200 provides a single-sided mattress with support and feel characteristics which are superior to one-sided designs with only padding or fabric layers under the innerspring or coils, and yet which has a low production cost.

The use of the edge components 300, 310 in combination with the foam deck 200 to form the unitized foam structure further enables the addition of a second foam deck on the opposing side of the innerspring 110, as shown in FIGS. 7, 9 and 17. The second foam deck 200 is similarly thermally bonded or welded to the opposite edge of the edge components, 300 or 310. A second opposing foam deck 200 can be used in either a one-sided mattress or a two-sided mattress. This unitized foam structure provides complete unibody construction and encapsulation of the innerspring 110, reducing the possibility of any undesired deformation of or damage to the innerspring.

Additional foam components can be added to the unitized foam structure as shown for example in FIGS. 6, 7, 9 and 17. An anti-roll-off piece 400 can be positioned about the perimeter of the unitized foam structure, on a surface of the foam deck as shown in FIGS. 7, 9 and 17, or on an edge of the edge component 300 as shown in FIG. 6, and thermally welded thereto at weld 403. The anti-roll-off piece 400 can be placed about the entire perimeter of the foam deck 200, or just along the longitudinal edges. The additional amount of foam at the edges of the mattress provide an even stiffer support which is preferred to hold up to the pressures of sitting on the edge of the mattress. Other foam components of various configurations can be attached to the major support surface of the foam deck 200 for contouring or structural strength as desired. The expansive surface area of the upper exterior wall 312 of edge component 310 also lends itself to attachment of additional foam components to the unitized structure by thermal bonding or welding as described.

Figure 12:
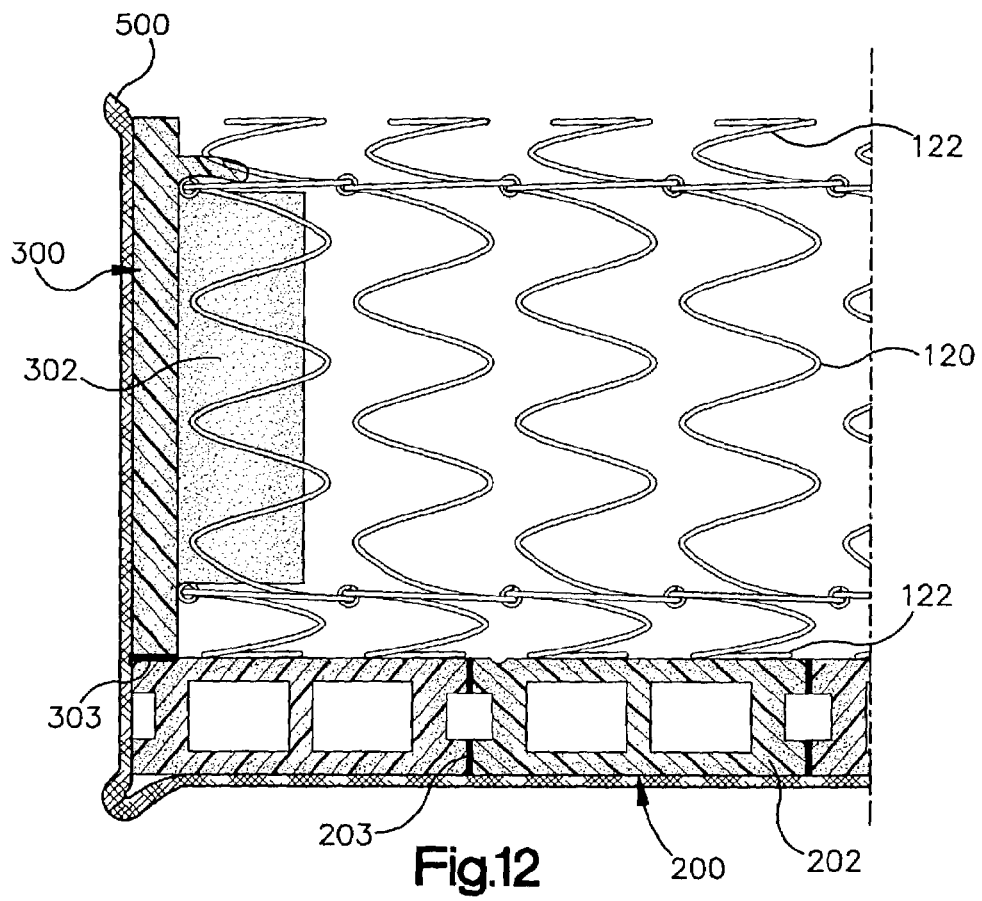
FIG. 12 is a cross-sectional view of an alternate embodiment of a unitized foam structure single sided mattress of the invention.

The unitized thermoplastic foam structures can also be used with different designs of innersprings and coils, including coils with different terminal configurations, such as the coils described in U.S. Pat. Nos. 5,713,088, as shown in FIGS. 12 and 16, with terminal convolutions 122 of coils 120 in support contact with the upper surface 210 of foam deck 200.

As shown in FIGS. 13 and 14, other foam components which interface with the coils of the innerspring can be used in conjunction with the unitized foam structure, such as foam pillars 410 which are positioned within the coil bodies and extending generally perpendicular from the underlying or overlying foam decks 200, adding stiffness and support as desired locations to the unitized foam structure mattress 100.

As shown in FIG. 1, the unitized foam structure mattress 100 is upholstered with material layer or layers 500, which may included an underlayment of a padding and/or non-woven, and an outer upholstered material, which may be foam-backed, and closed with tape edges 510. The rigidity of the unitized foam structure provides the ideal form for the upholstery material 500, with smooth flat surfaces and well-defined corners over which the material can be pulled taut, and secured directly to one or more of the foam components, such as edge components 300, by flare staples or the like. The well-defined corners of the edge components 300 provide an ideal guide and support for the overlying tape edges 510, resulting in very straight tape edges which gives the mattress a highly finished appearance.

What is claimed is:

1. A unitized thermoplastic foam structure mattress comprising:
    an innerspring having a plurality of spring elements arranged in an array and defining a first support side, a second support side parallel to the first support side, and a perimeter about the first and second support sides;
    a foam deck adjacent one of the support sides of the innerspring the foam deck having a plurality of box beam segments with first and second panels and at least one web between the first and second panels, and at least one additional foam component welded to the foam deck and engaged with the innerspring.

2. The unitized foam structure mattress of claim 1 wherein the innerspring is a wire form innerspring having a plurality of interconnected coils, terminal ends of the coils forming the support sides of the innerspring.

3. The unitized foam structure mattress of claim 1 wherein the foam deck has a thickness dimension which is approximately one-sixth a height dimension of the innerspring.

4. The unitized foam structure mattress of claim 1 wherein the foam deck has an area greater than the support sides of the innerspring.

5. The unitized foam structure mattress of claim 1 wherein a surface area of a panel of the foam deck is approximately equal to a surface area of a support side of the innerspring and the at least one additional foam component.

6. The unitized foam structure mattress of claim 1 wherein the at least one additional foam component has a height dimension approximately equal to or greater than a height dimension of the innerspring.

7. The unitized foam structure mattress of claim 1 wherein the at least one additional foam component is located at a periphery of the innerspring.

8. The unitized foam structure mattress of claim 1 further comprising an additional thermoplastic foam deck adjacent a support side of the innerspring.

9. The unitized foam structure mattress of claim 8 wherein the at least one additional foam component extends from one foam deck to the additional thermoplastic foam deck.

10. The unitized foam structure mattress of claim 8 wherein the at least one additional foam component extends from one foam deck to the additional thermoplastic foam deck and about a perimeter of the innerspring to substantially encapsulate the innerspring.

11. The unitized foam structure mattress of claim 1 further comprising an additional foam component located on a support side of the innerspring opposite the foam deck.

12. The unitized foam structure mattress of claim 1 further comprising at least one layer of padding adjacent a support side of the innerspring opposite the foam deck, and upholstery over the layer of padding.

13. The unitized foam structure mattress of claim 1 wherein the at least one additional foam component is in the form of a box beam.

14. The unitized foam structure mattress of claim 1 further comprising separate foam components engaged with the innerspring.

15. A mattress comprising:
    a thermoplastic foam deck having a planar support surface formed by a first panel, a second panel parallel to and spaced from the first panel and at least one web between the first and second panels;

an innerspring positioned upon the support surface of the foam deck, and at least one additional foam component which is welded to the planar support surface of the foam deck and engaged with the innerspring.

16. The mattress of claim 15 wherein the at least one additional foam component is thermally bonded to the support surface of the foam deck, and is located proximate to the innerspring.

17. The mattress of claim 15 wherein the at least one additional foam component is located at a perimeter of the innerspring.

18. The mattress of claim 15 wherein the foam deck is comprised of a plurality of thermoplastic box beams which are welded together.

* * * * *